(No Model.)
J. HAISH.
BARBED FENCE WIRE.
No. 261,703.  Patented July 25, 1882.
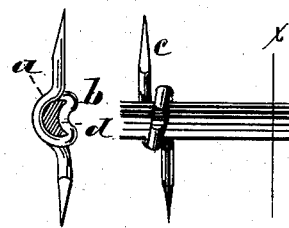
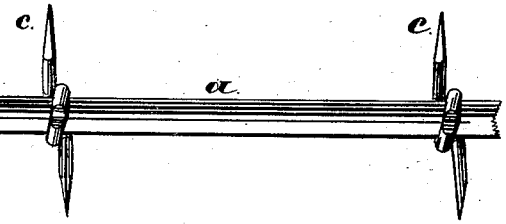
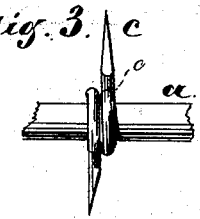
Witnesses:
Inventor:

UNITED STATES PATENT OFFICE.

JACOB HAISH, OF DE KALB, ILLINOIS.

BARBED FENCE-WIRE.

SPECIFICATION forming part of Letters Patent No. 261,703, dated July 25, 1882.

Application filed April 24, 1882. (No model.)

*To all whom it may concern:*

Be it known that I, JACOB HAISH, residing at De Kalb, in the county of De Kalb and State of Illinois, and a citizen of the United States, have invented a new and useful Improvement in Barbed Fence-Wire, of which the following is a full description, reference being had to the accompanying drawings, in which—

Figure 1 is an elevation; Fig. 2, a cross-section at line $x$ of Fig. 1; Fig. 3, an elevation the reverse of Fig. 1; Fig. 4, a cross-section of the wire shown in Figs. 1, 2, and 3. Fig. 5 is a view similar to Fig. 4, but showing two concave depressions in the wire.

This invention relates to that class of barbed fence-wire in which wire barbs are wound around a single longitudinal wire or bar.

The object of this invention is to provide an improved method of securing such wire barbs upon a single wire; and the invention consists in barbed fence-wire composed of a main wire having in its side a longitudinal depression or groove to form longitudinal upper and lower sharp corners, and of wire barbs coiled around the main wire, and with portions of the wire barbs forced into the concave depression, so that the sharp corners formed by the latter will indent the wires of the barbs, all in such manner that the wire barbs will be rigidly secured in place and effectually prevented from turning around or sliding longitudinally on the main wire.

In the drawings, $a$ represents a single longitudinal wire, which is half-round upon one side and has upon the opposite side a concave depression, $b$, as shown in Figs. 2 and 4.

$c$ are barbs made from pieces of wire of suitable length and pointed at the ends, which wires are secured to the main wire $a$ by first winding the barb wire around the main wire, as shown in Figs. 1, 2, and 3, and then forcing that portion $d$ of the barb wire which is over the groove $b$ in the main wire into such groove, as shown in Fig. 2, which can rapidly be done by suitable machinery. By this means the barbs will be held securely in place on the main wire, so that they cannot rotate thereon and cannot slip thereon longitudinally. It will be seen that rotation will be effectually prevented, because a portion of the barb is forced into the groove $b$ in the main wire, and the sharp longitudinal corners formed by the concave depression will indent the wire of the barb. This forcing of the wire of the barb down into such concave depression or groove and the indenting of the barb by the sharp corners formed by the concave depression tighten the barb upon the main wire so effectually that it cannot slide thereon.

I do not limit myself to the use of a main wire grooved only upon one side. It might be grooved upon opposite sides, as shown in Fig. 5.

In manufacturing, the main wire $a$ may, if desired, be slightly twisted, so that the points of the barbs will stand in different directions.

I am aware that barb fence-wire has heretofore been composed of a twisted main wire elongated in cross-section and having coiled around it the wire barbs; also, that barbed fence-wire has been composed of a main wire having flat sides around which the wire barbs are coiled; and, further, that wire for the manufacture of twisted-wire goods has been provided with longitudinal square grooves for strengthening the wire by compacting the fiber of the same. Such, however, are essentially different from my invention, and are not claimed by me.

What I claim as new, and desire to secure by Letters Patent, is as follows:

A barbed fence-wire composed of a single main wire provided with a longitudinal depression to form two sharp corners, as described, and a series of wire barbs wound around the main wire and rigidly secured thereto by depressing portions of the wire barbs into the depression in the main wire, whereby the sharp corners of the depression are caused to indent the wire barbs, substantially as and for the purposes described.

JACOB HAISH.

Witnesses:
E. A. WEST,
ALBERT H. ADAMS.